US010989455B1

(12) United States Patent
Sykes et al.

(10) Patent No.: US 10,989,455 B1
(45) Date of Patent: Apr. 27, 2021

(54) INTEGRATED HYBRID THERMOSTATIC EXPANSION VALVE AND METHOD FOR PROVIDING UNIFORM COOLING OF HEAT GENERATING DEVICES

(71) Applicant: Mainstream Engineering Corporation, Rockledge, FL (US)

(72) Inventors: David M. Sykes, Melbourne, FL (US); Robert P. Scaringe, Indialantic, FL (US); Gregory S. Cole, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 16/886,933

(22) Filed: May 29, 2020

Related U.S. Application Data (63) Continuation-in-part of application No. 15/840,271, filed on Dec. 13, 2017, now abandoned.

(51) Int. Cl.
    *F25B 41/31* (2021.01)

(52) U.S. Cl.
    CPC ........ *F25B 41/31* (2021.01); *F25B 2341/068* (2013.01); *F25B 2600/2519* (2013.01)

(58) Field of Classification Search
    CPC ........ F25B 41/062; F25B 41/06; F25B 41/04; F25B 2341/063; F25B 2341/065; F25B 2341/068; F25B 2341/0683; F25B 2400/0411; F25B 2500/15; F25B 2500/08; F25B 2500/26; F25B 2700/2117; F25B 2700/21173
    See application file for complete search history.

(56) References Cited

U.S. PATENT DOCUMENTS

| | | | |
|---|---|---|---|
| 4,242,116 A | 12/1980 | Aschberger et al. |
| 4,606,198 A | 8/1986 | Latshaw et al. |
| 5,177,972 A | 1/1993 | Sillato et al. |
| 5,251,459 A | 10/1993 | Grass et al. |
| 6,244,561 B1 | 6/2001 | Hansen, III et al. |
| 7,036,744 B2 | 5/2006 | Hirota |
| 7,707,844 B2 | 5/2010 | Nestler et al. |
| 7,913,503 B2 | 5/2011 | Lu et al. |

(Continued)

FOREIGN PATENT DOCUMENTS

DE       4238531 A1   2/1994

*Primary Examiner* — Joseph F Trpisovsky
(74) *Attorney, Agent, or Firm* — Michael W. O'Neill, Esq.

(57) ABSTRACT

An apparatus and method are disclosed for ensuring adequate and uniform cooling for any heat-generating device that experiences large heat pulses by integrating parallel expansion devices and their control directly into each of a discrete cooling load or cold plate. One of the parallel expansion devices is an integrated cartridge thermostatic expansion valve (TXV) and the other is an electrically-actuated valve. The TXV is positioned such that a sensing element is located directly within an exit refrigerant stream, thereby improving time-response of the valve and eliminating the need for a capillary tube. The electrically-actuated valve provides a sudden burst of refrigerant while the TXV is responding to sudden heat pulses and operates at the command of the heat generating system or triggered by a temperature rise. The disclosed operational method leads to an order of magnitude reduction in settling time after a heat pulse.

14 Claims, 6 Drawing Sheets

(56) References Cited

U.S. PATENT DOCUMENTS

| | | |
|---|---|---|
| 7,913,504 B2 | 5/2011 | Lu et al. |
| 9,398,722 B1 | 7/2016 | Sykes et al. |
| 2002/0174670 A1* | 11/2002 | Kjong-Rasmussen ........................ F25B 41/062 62/222 |
| 2006/0219965 A1* | 10/2006 | Hirota ................... F25B 41/062 251/30.02 |
| 2014/0000731 A1 | 1/2014 | Sciuto et al. |

* cited by examiner

INTEGRATED HYBRID THERMOSTATIC EXPANSION VALVE AND METHOD FOR PROVIDING UNIFORM COOLING OF HEAT GENERATING DEVICES

CROSS-REFERENCE TO RELATED APPLICATIONS

This application is a continuation-in-part of U.S. patent application Ser. No. 15/840,271, filed Dec. 13, 2017, which is incorporated by reference herein in its entirety.

BACKGROUND

The present invention relates to an apparatus and method for ensuring adequate and uniform cooling for a single heat-generating device or an array of discrete heat-generating devices mounted to cold plates. Heat fluxes and temperature uniformity constraints for modern electronics and optics are progressively demanding. As this occurs, the cooling technology for these components shifts from low-cost legacy solutions like air cooling and liquid cooling that produce heat transfer coefficients of 100s to 1000s of $W/m^2K$ to advanced thermal management solutions, such as vapor-compression cooling that can supply heat transfer coefficients up to 100,000 $W/m^2K$.

Vapor compression systems require expansion devices (also known in the art as throttling devices) between a condenser and a number of evaporators that primarily perform the function of throttling the refrigerant (sudden drop in pressure) before allowing the refrigerant to flow to each evaporator based on evaporator (or cold plate) heat load. Various types of expansion devices are well known in the art including mechanically passive (i.e., no feedback control) devices including orifice plates and capillary tubes, and mechanically-active devices where there is feedback control of the valve based on the exit condition of the refrigerant leaving the evaporator or conditions within the condenser or evaporator. Exit feedback-controlled throttling (or expansion devices as they are commonly called) include thermal expansion valves (TXVs) and electronic or electrically-actuated expansion valves (EXVs) which use evaporator exit superheat temperature feedback. Float expansion valves use feedback based on the level of liquid refrigerant in the evaporator or condenser rather than the superheat at the exit of the evaporator. For example, a low-side float valve expansion device controls the flow of refrigerant to the evaporator based on feedback on the level of liquid in the evaporator. Likewise, a high-side float valve expansion device controls the flow of refrigerant to the evaporator based on feedback on the level of liquid in the condenser. The present invention can employ any type of expansion device, with or without feedback control; however, the currently preferred embodiment employs a TXV expansion device.

The conventional TXV approach, for example, as disclosed in U.S. Pat. No. 4,750,334 employs an external sensing bulb filled with a temperature sensitive working fluid that is mechanically attached to the outlet of the evaporator. Temperature changes at the outlet of the evaporator are converted to changes in working fluid pressure within the external sensing bulb. The pressure within the external sensing bulb is communicated through a capillary tube to a diaphragm which works against a mechanically resistive force (usually a mechanical spring) to open the valve. This is also discussed in U.S. Pat. No. Re. 23,706 where an "equalizer passage" is used to communicate the pressure at the inlet of the evaporator to the underside of the follower and of the opposite side of the pressure created by the sensing bulb. The balance of forces generated by the diaphragm, mechanical spring, and fluid pressures results in the opening action of the valve. The nominal mechanical spring initial displacement, mechanical spring stiffness, and temperature-pressure relationship of the fluid in the sensing bulb are chosen such that the valve ensures a near constant thermodynamic superheat at the exit of the evaporator over a range of operating temperatures. The mechanical spring displacement can be adjusted during operation to adjust the superheat temperature of the refrigerant to the desired value.

Though very widely used in the heating, ventilation, and air conditioning (HVAC) industry, conventional TXV technology has a limitation when applying it to a highly variant heat load with many fast heat load transients on devices that require precise temperature control, such as electronics for lasers, microwaves, and transmit/receive modules for radar systems. The conventional TXV uses an external sensing bulb that is typically in direct mechanical contact with the outlet tube of the evaporator. This installation approach leads to undesirable time lag from the following heat transfer processes: 1) convection of the refrigerant to the inner wall of the evaporator outlet tube, 2) conduction through the evaporator outlet tube wall, 3) conduction across the mechanical interface between the evaporator outlet tube and the sensing bulb (element), and 4) the sensible energy of the sensing bulb. In addition, time lag is increased from cold plate mass (thermal inertia) and transit time of the refrigerant within the cold plate. The combination of these time lags with the heat transfer time lag precludes conventional TXV use in cold plates with sudden large heat load variations that require precise temperature control. One object of this invention is to dramatically improve the time response, i.e., reduce the time lag of conventional cold plates using an expansion device.

We have previously found that integrating a compact thermostatic expansion device (TXV) directly into the cold plate or evaporator significantly reduces these heat transfer time lags and improves performance. An example of this approach is disclosed in U.S. Pat. No. 9,398,722 B1, issued to Sykes et al. The approach disclosed in the '722 Patent allows the sensing element to be integrated into the TXV, thereby eliminating the capillary tube that is seen in conventional TXV systems and improving the time response of the TXV. The improved response time is achieved because the sensing element can be immersed in the exiting refrigerant stream reduces or eliminates three of the four restrictive heat transfer mechanisms noted above for a conventional TXV. This herein now identified as an integrated TXV was configured as a compact cartridge having an integrated sensing element located directly in a stream of refrigerant exiting the cold plate.

While the integrated TXV locally controls flow and has a response time much faster than conventional TXVs, the thermal inertia of the integrated sensing element coupled with the transient lag associated with the cold plate mass and coolant passage length render this approach less than ideal for rapid thermal heat pulse applications where the turn-on time is less than 100 milliseconds, e.g., lasers, high-powered microwaves, and other electromagnetic energy applications. In order to accommodate these rapid thermal heat pulse applications, we have discovered that the inclusion of a second valve in parallel to the aforementioned integrated TXV with specific relative sizing and operation to the integrated TXV can accommodate the faster heat load transients associated with pulsed heat loads in cold plates that require precise temperature control (e.g., ±2° C. during the transient). This improvement in the thermal response time is necessary to reduce or eliminate the rapid transient temperature spikes that can occur when a rapid transient heat load is applied to the cold plate and the time lag in the response time of the expansion device or the thermal inertia of the temperature sensing devices results in too slow of a thermal response to the sudden transient heat load or heat pulse.

SUMMARY

The present invention, that for convenience only can be referred to as an integrated hybrid TXV, places at least two discrete valves in parallel either as discrete components, integrated into a single housing, or integrated into a portion of a cold plate to accommodate high heat load transients while maintaining cold plate temperature. In addition, the present invention allows for superheat adjustment during operation of the vapor compression system.

In a currently preferred embodiment of the present invention in which the two discrete valves are integrated into a single body, the supply liquid refrigerant stream can flow in two parallel flow paths with a control valve in each path to control the flow in the respective path. The first valve is an integrated expansion device with or without feedback control, such as a TXV or EXV with feedback or a fixed orifice (without feedback). For expansion devices with feedback control, such as a TXV, a temperature-sensitive feedback expandable bulb is located directly in a stream of refrigerant exiting the cold plate (to improve the time response, that is reduce time lag, as discussed previously) and the second valve is a discrete electrically-actuated on/off (fully open or fully closed) valve, such as a solenoid valve, rapidly actuating electromechanical-actuated gate valve, electromechanically-actuated butterfly valve, or any other form of valve that can be rapidly opened by an electrical signal (hereafter referred to as an electrically-actuated valve). During low heat loads, the electrically-actuated valve remains closed, while refrigerant flows only through the integrated expansion device, such as a TXV. Refrigerant flow and superheat control is accomplished by the aforementioned means described in the '722 Patent, the subject matter of which is incorporated by reference herein. At the initiation of a sudden heat load (e.g., firing a laser, or turning on of a high power electronic device requiring cooling), the electrically-actuated valve opens, creating a parallel flow path, and thereby providing sufficient refrigerant flow to keep the cold plate within a desired temperature range, while providing the additional time for the feedback-controlled expansion device, such as the integrated TXV's, to respond to the sudden heat rate change. That is providing time for the feedback from the temperature-sensitive feedback expandable bulb located directly in a stream of refrigerant exiting the cold plate to respond to the heat load manifested by the thermodynamic quality and temperature of the exiting refrigerant.

For expansion devices without feedback control, such as an orifice plate or capillary tube expansion device, there is no sensing element to provide feedback to control the opening of the expansion device. The second valve is once again a discrete electrically-actuated on/off (fully open or fully closed) valve, such as a solenoid valve, rapidly actuating electromechanical-actuated gate valve, electromechanically-actuated butterfly valve, or any other form of valve that can be rapidly opened by an electrical signal (hereafter referred to as an electrically-actuated valve) once again plumbed in a parallel from arrangement with the expansion device. During low heat loads, the electrically-actuated valve remains closed, while refrigerant flows only through the integrated expansion device, such as an orifice plate or capillary tube. Where the expansion device has been sized for the nominal cooling capacity of the cold plate (and has no feedback control). At the initiation of a sudden heat load (e.g. firing a laser, or turning on of a high power electronic device requiring cooling), the electrically-actuated valve opens, creating a parallel flow path, and thereby providing sufficient refrigerant flow to keep the cold plate within a desired temperature range, while the heat load is above the nominal heat load cooling capacity of the expansion device, such as a fixed orifice or capillary tube. That is providing extra cooling capacity for heat loads above the nominal heat load.

The discharge from the electrically-actuated valve is in close proximity to the discharge of the integrated expansion device, such as a TXV, to promote mixing prior to flowing into the cold plate while discouraging phase maldistribution from having two separate flow streams. While our currently preferred embodiment incorporates these two valves in parallel flow paths integrated into the cold plate, these two valves could, of course, be external to the cold plates or external to any form of evaporative cold plate or heat exchanger, as long as the two flow paths are parallel and recombine prior to or just after entering the heat exchanger or cold plate.

There are many known strategies to activate the opening of the on/off electrically-actuated valve in response to known or anticipated heat transients. These strategies include triggering with a cold plate, component, or fluid temperature above a given threshold. However, these methods of triggering the actuation of the on/off electrically actuated valve are too slow, resulting in unacceptable temperature excursions (e.g., >±2° C.). The currently preferred embodiment addresses this limitation and is such that the electrically actuated valve will be turned "on" when high heat loads are applied and "off" when high heat loads are no longer being applied. That is, the spike power that is suddenly being supplied to the heat generating device can also be used to open the on/off electrically-actuated valve. Using this fast-response thermal control strategy also impacts the capacity range of each valve. We have found that for optimum performance, both the flow capacity of the electrically-actuated valve and the integrated expansion device, such as a TXV, are critical to provide tight thermal control of the cold plate temperature during spikes in thermal heat load.

We have also discovered that a particular balance needs to be achieved in the flowrate between the two valves to promote dynamic stability during sudden heat applications. We have discovered that temperature overshoot is reduced by an order of magnitude and the thermal stabilization time reduced substantially when the secondary electrically-actuated valve flow path is sized such that it supplies between 1.5 to 3 times, preferably 1.9 times, the flowrate of the integrated expansion device, such as a TXV. Ratios substantially below 1.5 result in low refrigerant velocities immediately following a sudden heat pulse. These low refrigerant velocities result in a long time delay between the application of the heat pulse and the sensing element within the integrated expansion device, such as a TXV, sensing a superheat large enough to open. During this delay, the heat application continues at low refrigerant flow leading to dry out, and ultimately an unacceptably large temperature rise (which can be as high as 30-50° C.). Ratios substantially above 3 times reduce the flow through the TXV under steady state loads below the normal control range. This results in the integrated expansion device, such as a TXV "hunting" or intermittently, completely closing and opening larger than needed. During this condition, the cold plate temperatures will oscillate unacceptably in response to the oscillatory behavior of the integrated expansion device, such as a TXV.

In our currently preferred embodiment, the integrated hybrid TXV is constructed such that an integrated TXV and an electrically-actuated valve are assembled into a single housing that is part of or permanently attached to the cold plate. Inlet and outlet for the integrated hybrid TXV are tube stubs that can be mated to the remainder of the vapor compression system by a variety of means identical to the interface with a conventional TXV inlet and a conventional evaporator outlet. In one currently preferred embodiment, a partial hexagonal shape that is cut into the housing interfaces with the hexagonal portion of the superheat adjustment via shims to prevent the integrated TXV from rotating. The prevention of rotation allows the integrated TXV to be adjusted while still installed in the housing with the vapor compression system seals intact. Accordingly, superheat adjustments can be made while the system is operating.

BRIEF DESCRIPTION OF THE DRAWINGS

These and other features, aspects, and advantages of the present invention will become better understood with regard to the following description, appended claims, and accompanying drawings where:

FIGS. 8A and 8B are, respectively, perspective views of the integrated hybrid valve assembly of the present invention showing the assembly directly connected with the cold plate and the assembly joined to the cold plate via tubing or the like.

DESCRIPTION

In the Summary above and the Description, and the claims below, and in the accompany drawings, reference is made to particular features (including method steps) of the invention. It is to be understood that the disclosure of the invention in this specification includes all possible combinations of such particular features. For example, where a particular aspect or embodiment of the invention, or a particular claim, that feature can also be used, to the extent possible, in combination with and/or in the context of the other particular aspects and embodiments of the invention, and in the invention generally.

Figure 1:
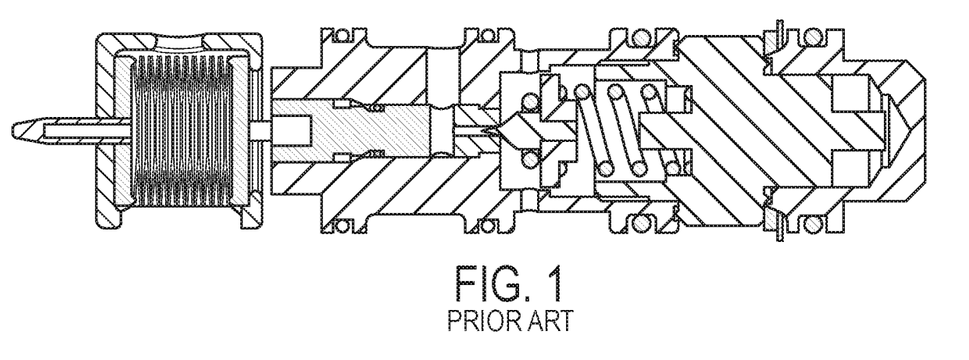
FIG. 1 is a cross-sectional view of the integrated TXV cartridge shown in U.S. Pat. No. 9,398,722.
Figure 2:
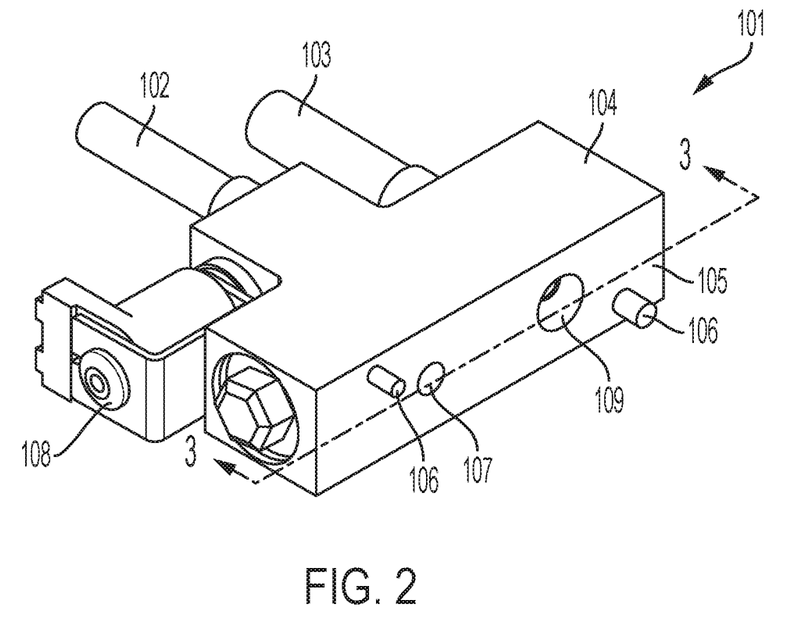
FIG. 2 is perspective view of one currently contemplated embodiment of the present invention.
Figure 8A:
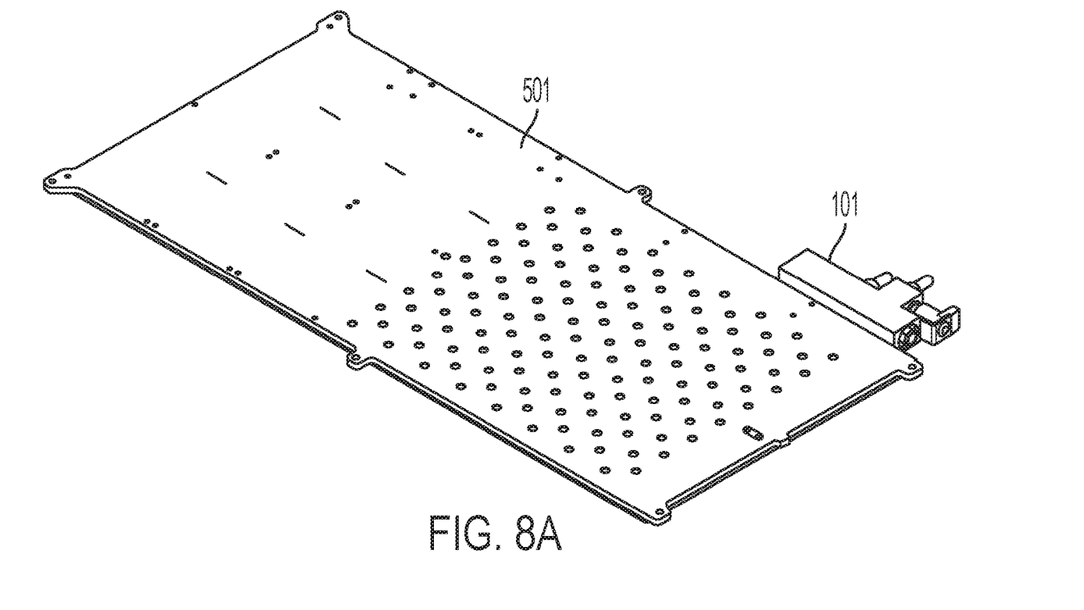
Figure 8B:
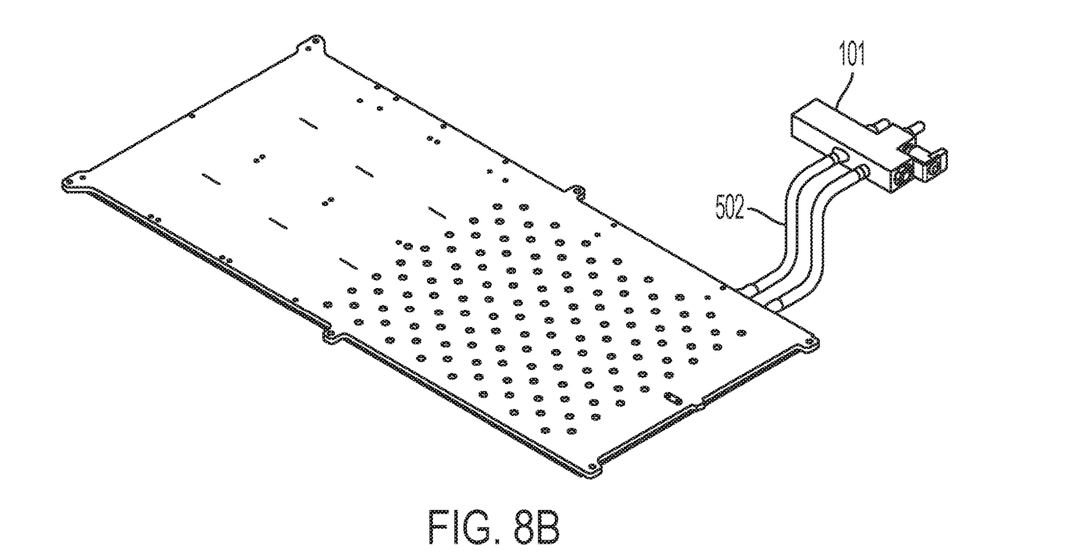

The integrated hybrid TXV of the present invention designated generally by numeral (101) in FIG. 2 is integrated directly into either a separate housing (104) or directly into a port in the vapor compression system cold plate (501) as seen in FIG. 8A and is coupled with a secondary electrically-actuated valve shown in detail in FIG. 3 and described below. Two copper interface tubes are brazed into the housing (104), namely a first smaller tube (102) that functions as a subcooled liquid inlet from the condenser of a vapor compression system and a second large tube (103) that functions as an outlet to return superheated vapor to the compressor of the vapor compression system. The copper interface tubes (102), (103) allow for conventional refrigeration braze joints, compression fittings, O-ring seal fittings, and other conventional tube attachment and sealing techniques routinely used in industry. While our currently preferred embodiment incorporates this integrated hybrid TXV into the cold plate, the integrated hybrid TXV can also be located external to the cold plate or evaporative heat exchanger as shown in FIG. 8B and connected to the cold plate or evaporative heat exchanger with tubing (502). The material of the housing (104) in the current embodiment is aluminum with a composition that facilitates controlled atmosphere or vacuum brazing in order to be secured to a cold plate, for example, see FIG. 8A. The housing (104) has an interface (105) with the cold plate geometry in which contain two differently-sized fluid ports (107), (109) and two locational dowel pins (106). The dowel pins (106) are dissimilar in size and asymmetric in orientation to prevent incorrect installation of the housing (104) to a cold plate. The first smaller port (107) supplies the cold plate with two-phase refrigerant from the integrated TXV and a secondary electrically-actuated valve (108), and the second larger port (109) receives superheated vapor refrigerant from the cold plate. The interface (105) between the housing (104) and the cold plate (501) is designed to be a control-atmosphere or vacuum brazed joint in our currently preferred embodiment. While this is our preferred manner of fabrication and assembly, one skilled in the art will understand that there a number of other ways of fabricating and assembling our disclosed invention.

Figure 3:
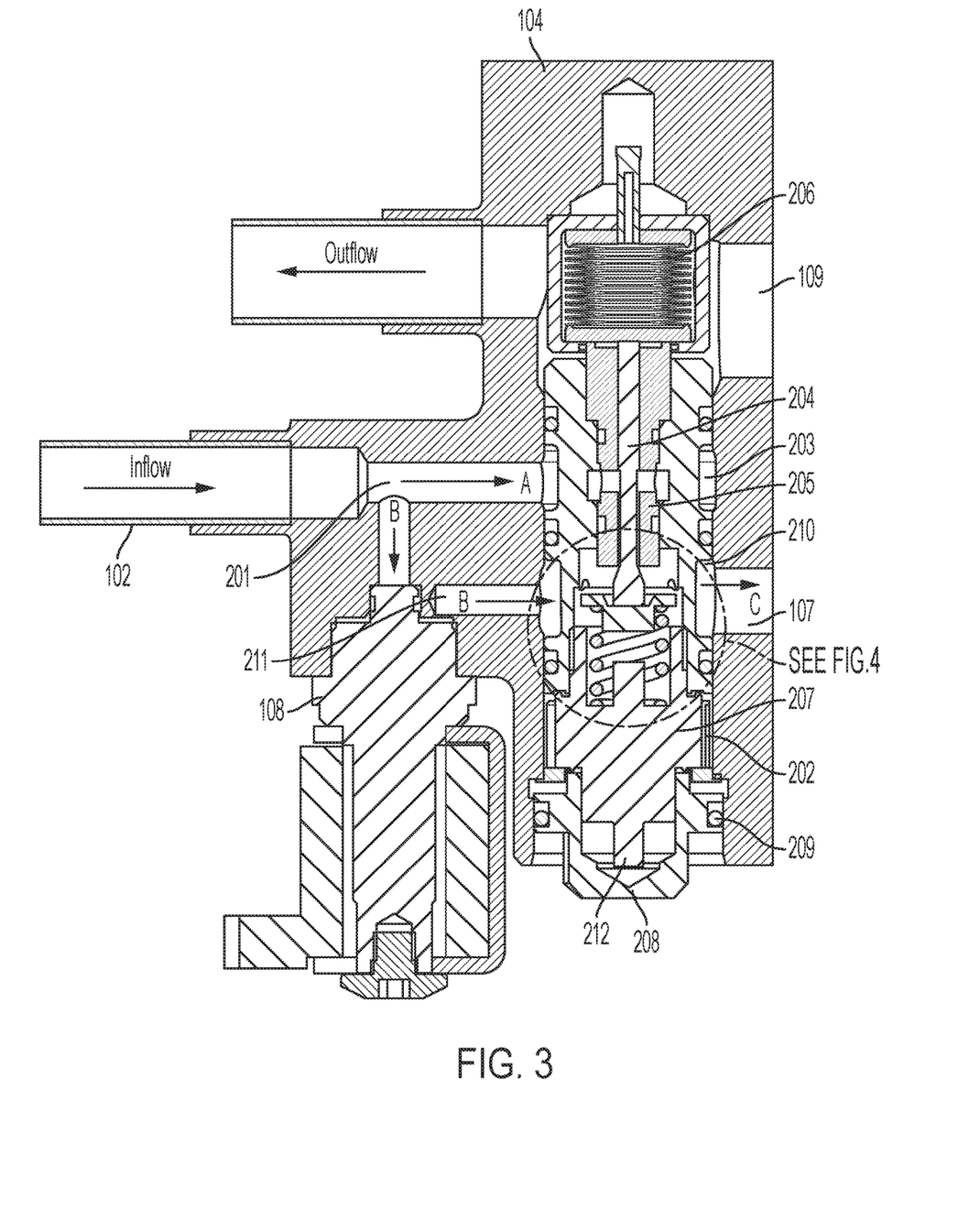
FIG. 3 is a cross-sectional view along line 3-3 of the embodiment shown in FIG. 2.

In the currently preferred embodiment, a compact, cartridge-like electrically-actuated valve (108) is placed in parallel with a cartridge-like integrated TXV (202) as seen in FIG. 3. High-pressure liquid refrigerant enters the assembly through the first smaller tube (102) and flows through a bifurcated passageway (201). The liquid is split as shown by arrows A, B and flows in parallel to the integrated TXV (202) and the secondary electrically-actuated valve (108). Between the bifurcated passageway (201) and the integrated TXV (202) is a first annular volume (203) from which the integrated TXV (202) draws. The annular volume (203) enables valve operation to be insensitive to rotational placement of the integrated TXV (202). Once refrigerant enters the integrated TXV (202) from the first annular volume (203), the refrigerant is expanded through the orifice (301) created by the space between the needle (204) and needle seat (205) as seen in the detail view of FIG. 4. Referring to both FIGS. 3 and 4, the orifice (301) size, and therefore the refrigerant flow rate, is determined by the needle (204) motion that is controlled by the expansion or contraction of a temperature-sensitive feedback expandable bulb, such as, the bellows (206) as it responds to sensed superheat, and a mechanical spring (303) whose initial deformation is controlled by the superheat adjustment module (207) as is well understood in the art. The superheat adjustment module (207) is protected against the environment by a superheat adjustment cap (208) and an environmental seal (209). The superheat adjustment cap (208) can be electroplated with zinc to be galvanically similar to the aluminum housing (104).

Figure 4:
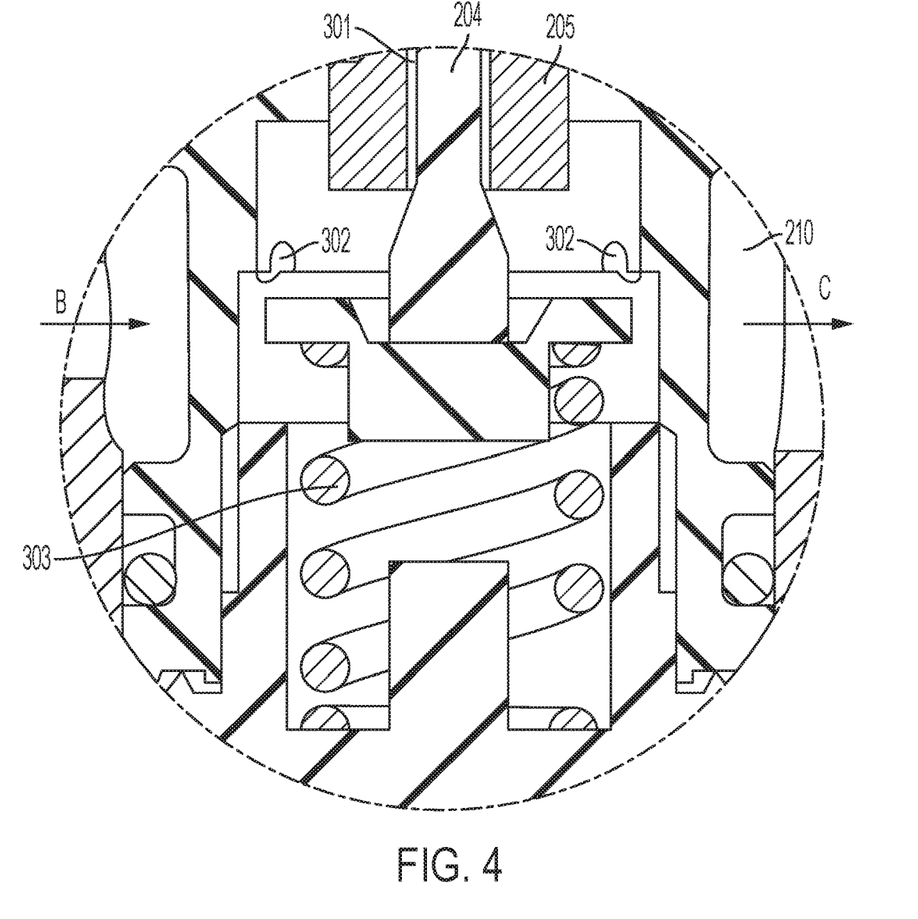
FIG. 4 is a detail view of the needle and needle seat area shown in FIG. 3.

The expanded refrigerant from the orifice (301) by way of flow path A is discharged through a plurality of holes (302) to a second annular volume (210). In parallel to flow path A, some of the flow may be permitted to flow through the electrically-actuated valve (108) by way of flow path B. High-pressure liquid refrigerant in flow path B is expanded through the secondary electrically-actuated valve (108) when opened and is eventually also discharged into the second annular volume (210) by way of an intermediate passage (211). The refrigerant from the second annular volume (210) which is a combination of flow path A and flow path B is then passed to the cold plate via the first port (107) by way of flow path C. The refrigerant is evaporated by heat added to the cold plate and returns to the housing (104) via the second port (109) where it flows around the bellows (206). The bellows has been designed to expand or contract in only in the axial direction, so as to move the needle (204) in relation to the needle seat (205). The bellows (206) responds (expands or contracts) to the temperature and pressure in the cold plate exhaust stream and the movement of the bellows thereby moves the needle (204) accordingly. Finally, the refrigerant then leaves the housing (104) via the second large tube (103). In general, the electrically-actuated valve (108) would only be opened in the event of a sudden increase in heat load or to equalize pressure upon system shut-down to reduce the startup load on the compressor (since restarting the compressor against a pressure differential would increase the load and current draw of the compressor).

Figure 5:
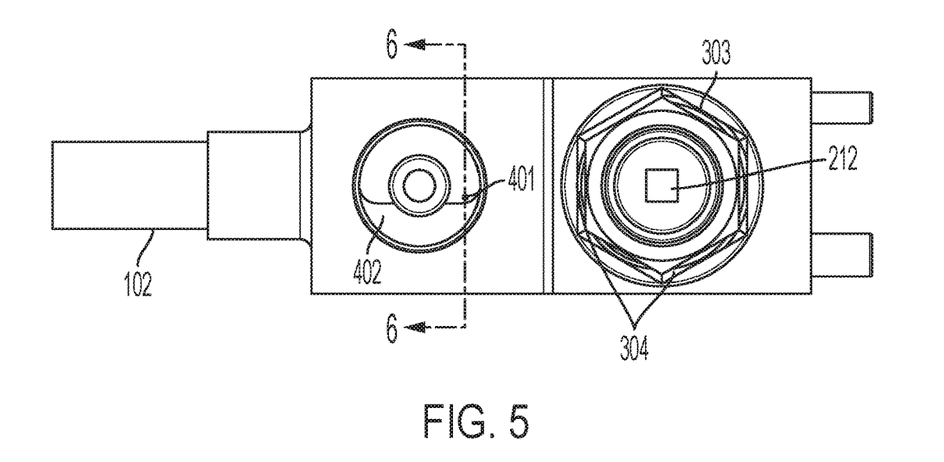
FIG. 5 is a side view of the embodiment shown in FIGS. 2 and 3 with secondary electrically-actuated valve and superheat adjustment cap removed.
Figure 6:
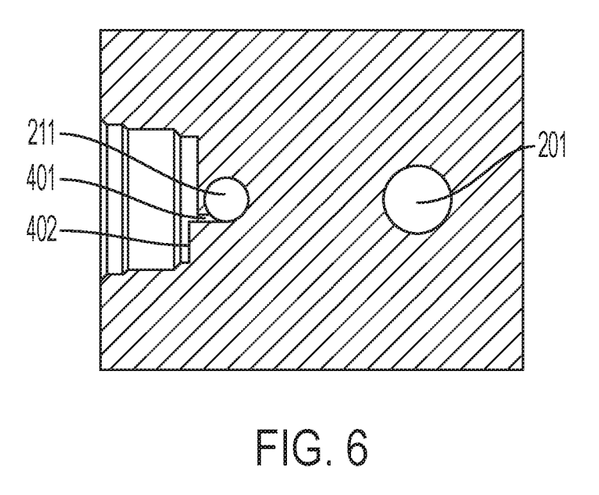
FIG. 6 is a cross-sectional view along line 6-6 of FIG. 5 through the precision orifice.

FIG. 5 shows the left side of the integrated hybrid TXV assembly (101) with the superheat cap (208) and the secondary electrically-actuated valve (108) removed. FIG. 6, which is a detail 6-6 of FIG. 5, shows a circular, sharp-edged or precision plain orifice (401) that is placed in series with the electrically-actuated valve (108) to achieve the desired range of flow in this flow path. As pointed out earlier, the geometry and components in the electrically-actuated valve flow path, including the precision plain orifice (401) and the electrically-actuated valve (108) are both sized for a flowrate for a given pressure loss such that they working together to supply between 1.5 to 3 times, preferably 1.9 times, the flowrate of the integrated TXV when the electrically-actuated valve is opened. Additionally, the ratio of flow between the two flow paths, A and B, is controlled by the relative size of the precision plain orifice (401) and the needle (204). The precision orifice (401) receives expanded refrigerant from the secondary electrically-actuated valve (108) and is positioned such that it intersects with an intermediate passage (211) that is coaxial with the first port (107) and is connected to the second annual volume (210). A partial boss (402) is provided at the bottom of the otherwise circular cavity between the secondary electrically-actuated valve (108) and the precision plain orifice (401) to ensure that the precision plain orifice (401) ingests the liquid portion of the two-phase flow from the secondary electrically-actuated valve (108).

FIGS. 3 and 5 also shows the unique mechanical securing of the integrated TXV (202). The integrated TXV (202) may need to be field-adjustable, and this entails turning the superheat adjustment screw (212). It is preferable to adjust the superheat adjustment screw (212) with the integrated TXV (202) already having been placed in the housing (104) so the vapor compression system seal can remain intact to avoid costly refrigerant recovery and charging procedures and to allow the superheat to be adjusted during operation. To accomplish this, a partially hexagonal feature (303) is machined into the housing to approximate the hexagonal shape of the superheat adjustment module (207). Shims (304) are placed in the void between the hexagonal portion of the superheat adjustment module (207) and the partially hexagonal feature (303) in the housing (104) that act as a rotational mechanical stop for the integrated TXV (202) that prevents rotation. Thus, the superheat adjustment screw can be turned relative to the integrated TXV (necessary to field adjust the superheat) without removing the integrated TXV from the housing and losing refrigerant charge. One or more axial retention mechanisms or fasteners such as internal rings or snap rings, or may be C-clip may be used between the superheat adjustment module and a cap to provide an axial mechanical stop for the integrated TXV in the housing. The arrangement of cap, C-clip, and integrated TXV allows the entirety of the integrated TXV to be environmentally protected during operation while also allowing for the superheat to be adjusted in place when not operating.

In summary, the integrated hybrid TXV according to the present invention provides faster time response and more precise thermal control than integrated TXVs alone, allows for field adjustment of the integrated TXV without breaking the vapor compression system seal, and provides a more compact and higher performance solution in comparison to conventional expansion valve alone.

Figure 7A:
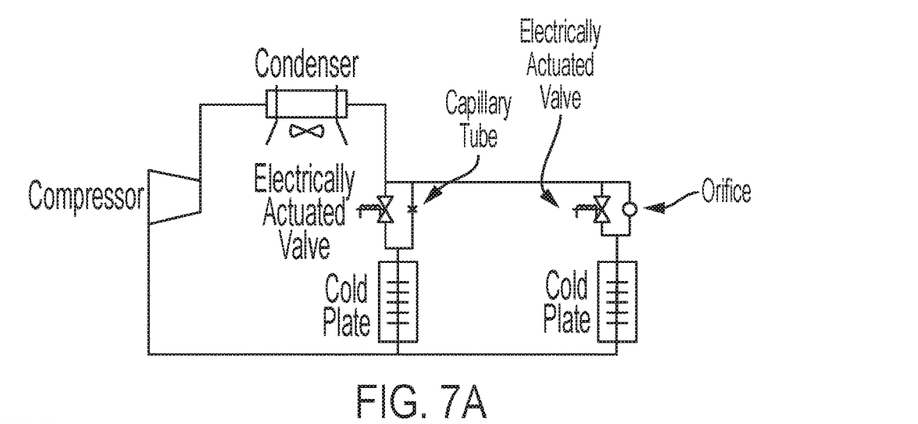
FIGS. 7A and 7B are, respectively, schematic diagrams of the hybrid valve assembly of the present invention using a mechanically passive expansion device such as orifice plates or capillary tubes associated with the evaporator of a conventional vapor control system and a feedback-controlled expansion devices such as evaporator-exit controlled TXVs and EXVs and float expansion valves that can utilize evaporator or condenser conditions, e.g. the liquid level in the evaporator or condenser.
Figure 7B:
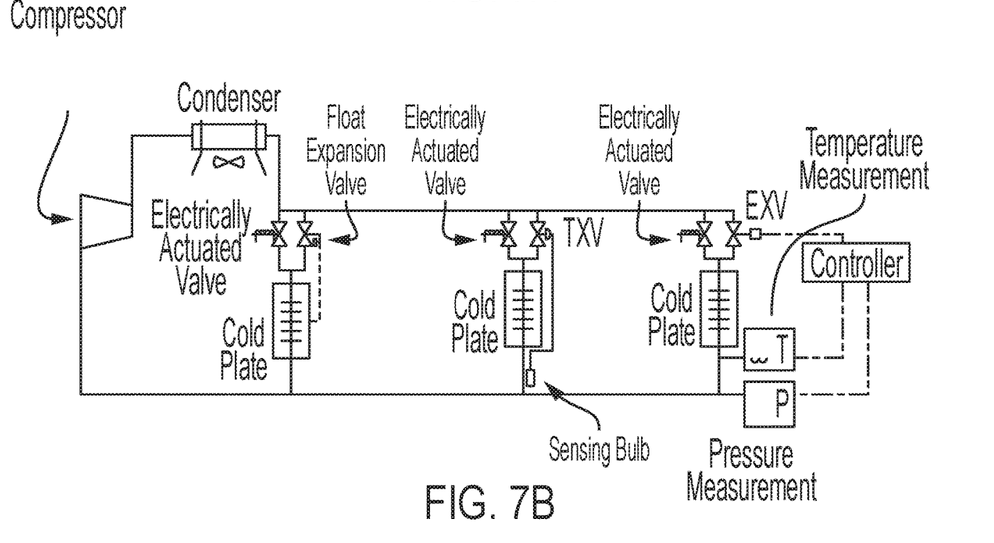

While a currently preferred embodiment of the invention has been illustrated and described, it should be understood that, after reading this disclosure, variations to this embodiment will be apparent to one skilled in the art without departing from the principles of the invention described herein. For example, one skilled in the art will now understand that an electrically-actuated expansion valve (EXV), capillary tube expansion device, orifice plate expansion device or any other type of throttling valve could be used in parallel with the electrically-actuated valve as shown in FIGS. 7A and 7B. Likewise, the single housing (101) can be integrated with the cold plate (501) or joined therewith by tubing (502) as shown, respectively, in FIGS. 8A and 8B.

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

What is claimed is:

1. A valve assembly for supplying a refrigerant flowrate to at least one cold plate in a vapor compression system, comprising:

a housing having a bifurcated passageway having a first flow path and a second flow path, an intermediate passage, a first orifice between the intermediate passage and the second flow path of the bifurcated passageway, a first annular volume oriented with the first flow path in the bifurcated passageway, and a second annular volume oriented with the intermediate passage;

an expansion valve in the housing and positioned within the first annular volume and second annular volume;

an electrically-actuated valve in the housing and positioned between the second flow path of the bifurcated passageway and the intermediate passage; and wherein the first orifice and the electrically-actuated valve are sized such that the refrigerant flowrate through the intermediate passage is 1.5 to 3 times more than the flowrate through the first flow path in the bifurcated passageway.

2. The valve assembly of claim 1, wherein the first orifice and the electrically-actuated valve are sized such that the refrigerant flowrate through intermediate passage is 1.9 times more than the flowrate through the second flow path in the bifurcated passageway.

3. The valve assembly of claim 1, wherein the expansion valve is a feedback-controlled expansion valve operatively arranged so that an expandable bulb thereof is located directly within an exit refrigerant stream of the at least one cold plate.

4. The valve assembly of claim 3, wherein the feedback-controlled expansion valve is a thermal expansion valve and the expandable bulb is a temperature-sensitive feedback expandable bulb located directly within the exit refrigerant stream of the at least one cold plate.

5. The valve assembly of claim 1, wherein the electrically-actuated valve operates in one of only a full-open position and only a full-closed position.

6. The valve assembly of claim 5, wherein the electrically-actuated valve is selected from the group consisting of a solenoid valve, a rapidly-actuating gate valve, and a butterfly valve.

7. The valve assembly of claim 1, wherein the expansion valve is a thermostatic expansion valve, and the electrically-actuated valve is configured to remain closed during low heat loads so that liquid refrigerant flows only through the first flow path in the bifurcated passageway.

8. The valve assembly of claim 1, wherein a partial boss is arranged in a cavity between the electrically-actuated valve and the first orifice to ensure that the first orifice ingests a liquid portion of two-phase refrigerant flow from the electrically-actuated valve.

9. The valve assembly of claim 8, wherein the two-phase refrigerant flow expands through the intermediate passage and into the second annular volume to a first port fluidly connected to the second annular volume.

10. The valve assembly of claim 1, further comprising:
the expansion valve having a needle, needle seat, and a plurality of holes for fluidly connecting the first annular volume and the second annular volume; wherein the needle and needle seat define a second orifice;
an expandable bulb in contact with the needle; and
wherein a movement of the expandable bulb moves the needle from the needle seat to create a space in the second orifice for expanded refrigerant to pass through the second orifice and to discharge from the plurality of holes into the second annular volume.

11. The valve assembly of claim 10, wherein the expanded refrigerant from the second annular volume enters a first port in fluid connection with the second annular volume.

12. The valve assembly of claim 11, further comprising:
a second port in the housing to receive superheated vapor refrigerant from at least one cold plate; and
wherein the expandable bulb is a temperature-sensitive feedback expandable bulb located in the housing and positioned adjacent the second port such that the superheated vapor refrigerant flows over the temperature-sensing element.

13. The valve assembly of claim 12, wherein the temperature-sensitive feedback expandable bulb is positioned adjacent the needle and, in response to the superheated vapor, axially moves the needle from the needle seat so that the expanded refrigerant in the first annular volume passes through the second orifice and discharges from the plurality of holes into the second annular volume.

14. The valve assembly of claim 1, wherein the expansion valve is a thermal expansion valve having a superheat adjustment module to allow for the adjustment of superheat during operation of the thermal expansion valve, and the housing has a partial hexagonal shape configured to interface with a hexagonal portion of superheat adjustment module of the thermostatic expansion valve in order to prevent the thermal expansion valve from rotating within the housing and to allow for adjustment of the thermostatic expansion valve during vapor compression system operation without having to remove the thermal expansion valve.

* * * * *